(12) United States Patent
Ciholas et al.

(10) Patent No.: US 12,411,204 B2
(45) Date of Patent: Sep. 9, 2025

(54) SYSTEM AND METHOD FOR DETERMINING THE ORIENTATION IN SPACE OF A LINEAR ARRAY OF RADIO RECEIVERS

(71) Applicant: CIHOLAS, INC, Newburgh, IN (US)

(72) Inventors: Mike Ciholas, Evansville, IN (US); Justin E Bennett, Newburgh, IN (US)

(73) Assignee: Ciholas, Inc., Newburgh (IN)

( * ) Notice: Subject to any disclaimer, the term of this patent is extended or adjusted under 35 U.S.C. 154(b) by 319 days.

(21) Appl. No.: 18/312,050

(22) Filed: May 4, 2023

(65) Prior Publication Data

US 2023/0358851 A1 Nov. 9, 2023

Related U.S. Application Data

(60) Provisional application No. 63/339,027, filed on May 6, 2022.

(51) Int. Cl.
*H04L 1/00* (2006.01)
*G01S 5/02* (2010.01)
*G01S 5/08* (2006.01)

(52) U.S. Cl.
CPC ............ *G01S 5/08* (2013.01); *G01S 5/0284* (2013.01)

(58) Field of Classification Search
CPC ........ G01S 5/08; G01S 5/0284; G01S 5/0221; G01S 3/48; G01S 5/0247; G01S 5/10; G01S 5/14; G01S 13/765

USPC ..................................................... 455/456.1
See application file for complete search history.

(56) References Cited

U.S. PATENT DOCUMENTS

| | | | |
|---|---|---|---|
| 9,709,663 B1 | 7/2017 | Ciholas et al. | |
| 10,401,472 B2 | 9/2019 | Ciholas et al. | |
| 10,764,071 B1 | 9/2020 | Ciholas et al. | |
| 2017/0162036 A1* | 6/2017 | Agardh | G08C 17/02 |
| 2018/0076875 A1* | 3/2018 | Haverinen | G01S 3/48 |
| 2018/0213355 A1* | 7/2018 | Smith | G01S 13/765 |
| 2020/0120509 A1* | 4/2020 | Stitt | B60R 25/245 |
| 2021/0124375 A1* | 4/2021 | Li | G08G 5/34 |

* cited by examiner

*Primary Examiner* — Tanmay K Shah
(74) *Attorney, Agent, or Firm* — Martin IP Law Group; C. Richard Martin (57) ABSTRACT

A system and method for determining the orientation of a linear array of radio receivers in space is provided. The system includes a primary radio receiver and a plurality of secondary radio receivers arranged in a collinear configuration and irregularly spaced apart from one another. The primary radio receiver and plurality of auxiliary radio receivers capable of receiving radio signals from a plurality of transmitters located in known, surveyed locations in a coordinate system. With the location of the primary receiver determined, the direction in which the aligned radio devices is pointed relative to the transmitters is then determined by using the phase angle of arrival (AoA) data from each transmitter.

21 Claims, 7 Drawing Sheets

SYSTEM AND METHOD FOR DETERMINING THE ORIENTATION IN SPACE OF A LINEAR ARRAY OF RADIO RECEIVERS

BACKGROUND OF THE INVENTION

Field of the Invention

The present invention relates to location of objects using radio frequency (RF) transmissions. More specifically, the present invention relates to a system and method for determining the orientation of a linear array of radio receivers in space.

Description of the Related Art

Existing systems are known that use RF transmissions to determine location of an object within a space. However, these systems are not capable of determining the orientation, or direction the object is pointing. While inertial sensors such as gyroscopes, accelerometers, and magnetometers have been used to do this, the aiming in the azimuth is affected by the magnetic field. This is problematic when operating in a steel building which adversely affects the accuracy of the magnetic field.

The system and method described herein is useful not only for tracking where an object is located, but where it is pointed. For example, the primary radio receivers P may be positioned on the base of a wand, and the secondary radio receivers $S_1$, $S_2$, $S_3$, $S_4$ can be positioned along the axis of the wand, and from the information collected, not only can the location of the wand be tracked and determined in a virtual environment, but the orientation that it is pointing can also be determined.

SUMMARY OF THE INVENTION

According to one presently preferred embodiment of the invention, there is provided system and method for determining the orientation of a linear array of radio receivers in space.

According to one aspect of the invention, there is provide a system for determining an orientation in space of a linear array of radio receivers in a workspace. The system comprises a primary radio receiver, a secondary radio receiver located a first distance from the primary radio receiver; a plurality of radio transmitters, and a processing unit. The primary radio receiver and secondary radio receiver are capable of measuring phase of arrival of a received signal. The plurality of radio transmitters are positioned in the workspace at known, fixed locations relative to the primary radio receiver. The processing unit is in communication with the primary radio receiver and the secondary radio receiver. The processing unit is capable of calculating an angle between each of the plurality of radio transmitters and an axis comprising a line passing through the primary radio receiver and the secondary radio receiver, and capable of calculating an orientation determination algorithm.

The secondary radio receiver may comprise a plurality of secondary radio receivers located collinearly along the axis. The distances between adjacent secondary radio receivers is preferably non-uniform. The primary radio receiver may be a transceiver. The plurality of radio transmitters may comprise at least three radio transmitters. The secondary radio receiver may comprise four secondary radio receivers located along the central axis.

The system for determining an orientation in space of a linear array of radio receivers may further comprise a tertiary radio receiver capable of measuring phase of arrival of a received signal. The tertiary radio receiver may be located a second distance from the primary radio receiver along a secondary axis comprising a line passing through the primary radio receiver and the tertiary radio receiver. The axis and the secondary axis are preferably offset from one another.

The secondary radio receiver may comprise a plurality of secondary radio receivers located along the axis. The tertiary radio receiver may comprise a plurality of tertiary radio receivers located along the secondary axis.

The present invention also provides a method for determining an orientation in space of a linear array of radio receivers in a workspace. First, radio signals are transmitted from a plurality of radio transmitters positioned in the workspace at known, fixed locations relative to a primary radio receiver capable of measuring phase of arrival of a received signal. The radio signals are received at the primary radio receiver, and at a secondary radio receiver capable of measuring phase of arrival of a received signal. The secondary radio receiver is located a first distance from said primary radio receiver. The phase of arrival of the radio signals is measured at the primary radio receiver and the secondary radio receiver, and then the phase of arrival is transmitted to a processing unit in communication with the primary radio receiver and the secondary radio receiver. Next, an angle determining algorithm is implemented to determine a calculated angle between each of the plurality of radio transmitters and a collinear axis comprising a line passing through the primary radio receiver and the secondary radio receiver using the measured phase of arrival at the primary radio receiver and the measured phase of arrival at the secondary radio receiver.

The method for determining an orientation in space of a linear array of radio receivers may further include the steps of: (a) selecting an arbitrary orientation of the linear array of receivers, (b) computing an estimated angle between the plurality of transmitters and the axis in the arbitrary orientation based on the known coordinate locations of the primary radio receiver and secondary radio receiver in the arbitrary orientation, and the known, fixed locations of the plurality of radio transmitters; (c) comparing the calculated angle to the estimated angle; (d) determining whether the estimated angle is within an acceptable margin of error to the calculated angle; (e) if the estimated angle for the arbitrary orientation is not within an acceptable margin of error, selecting a further arbitrary orientation; (f) repeating steps b-e for each further arbitrary orientation until an acceptable margin of error is reached.

The further arbitrary orientation reduces the margin of error. The radio signals from the plurality of radio transmitters may be transmitted sequentially. A processing unit that is in communication with the primary radio receiver and the secondary radio receiver may be provided to make the calculations and computations based on the phase angle data.

The method for determining an orientation in space of a linear array of radio receivers may further comprising the steps of: (a) storing a determined orientation of the linear array of radio receivers after the acceptable margin of error is reached; and (b) re-checking the angle of the linear array of radio receivers to the plurality of radio transmitters by beginning with the stored determined orientation of the linear object instead of the arbitrary point in step (a).

The step of receiving the radio signals at a secondary radio receiver capable of measuring phase of arrival of a received signal, located a first distance from the primary radio receiver, may comprise receiving said radio signals at a plurality of secondary radio receivers located along the axis. The distances between adjacent secondary radio receivers is preferably non-uniform.

A further aspect of the invention is a method for determining an orientation in space and roll of a linear array of radio receivers in a workspace. First, radio signals are transmitted from a plurality of radio transmitters positioned in the workspace at known, fixed locations relative to a primary radio receiver capable of measuring phase of arrival of a received signal. The radio signals are received at the primary radio receiver, and at a secondary radio receiver capable of measuring phase of arrival of a received signal. The secondary radio receiver may be located a first distance from the primary radio receiver along a primary axis comprising a line passing through the primary radio receiver and the secondary radio receiver. The radio signals are received at a tertiary radio receiver capable of measuring phase of arrival of a received signal. The tertiary radio receiver may be located a second distance from the primary radio receiver along a secondary axis comprising a line passing through the primary radio receiver and the tertiary radio receiver, wherein the primary axis and the secondary axis being offset from one another at a known, fixed angle. Next, the phase of arrival of the radio signals is measured at the primary radio receiver, the secondary radio receiver, and the tertiary radio receiver. The phase of arrival is then transmitted to a processing unit in communication with the primary radio receiver, the secondary radio receiver, and the tertiary receiver. An first orientation determining algorithm is implemented to determine a calculated angle between each of the plurality of radio transmitters and the primary axis using the measured phase of arrival at the primary radio receiver and the measured phase of arrival at the secondary radio receiver. A second orientation determining algorithm is implemented to determine a calculated angle between each of the plurality of radio transmitters and the secondary axis using the measured phase of arrival at the primary radio receiver and the measured phase of arrival at the tertiary radio receiver. A roll determining algorithm is implemented to calculate the roll of the linear array of radio receivers based on the known fixed angle between the secondary receiver located on the primary axis and the tertiary receiver located on the secondary axis and the calculated angles between each of the plurality of radio receivers and the secondary axis.

The radio signals from the plurality of radio transmitters may be transmitted sequentially. A processing unit that is in communication with the primary radio receiver, the secondary radio receiver, and the tertiary radio receiver may be provided to make the calculations and computations based on the phase angle data. The step of receiving the radio signals at a secondary radio receiver capable of measuring phase of arrival of a received signal, located a first distance from said primary radio receiver, may comprise receiving the radio signals at a plurality of secondary radio receivers located along the axis. The step of receiving the radio signals at a tertiary radio receiver capable of measuring phase of arrival of a received signal, located a first distance from the primary radio receiver, may comprise receiving the radio signals at a plurality of tertiary radio receivers located along the axis. The distances between adjacent secondary radio receivers and adjacent tertiary radio receivers may be non-uniform.

These and other objects, features and advantages of the present invention will become apparent from a review of the following drawings and detailed description of the preferred embodiments of the invention.

BRIEF DESCRIPTION OF THE DRAWINGS

The present invention can best be understood in connection with the accompanying drawings. It is noted that the invention is not limited to the precise embodiments shown in the drawings, in which.

DETAILED DESCRIPTION OF THE INVENTION

For purposes of promoting and understanding of the principles of the invention, reference will now be made to the embodiments illustrated in the drawings and specific language will be used to describe the same. It will nevertheless be understood that no limitation of the scope of the invention is thereby intended. The invention includes any alterations and further modifications in the illustrated devices and described methods and further applications of the principles of the invention that would normally occur to one skilled in the art to which the invention relates.

Figure 1:
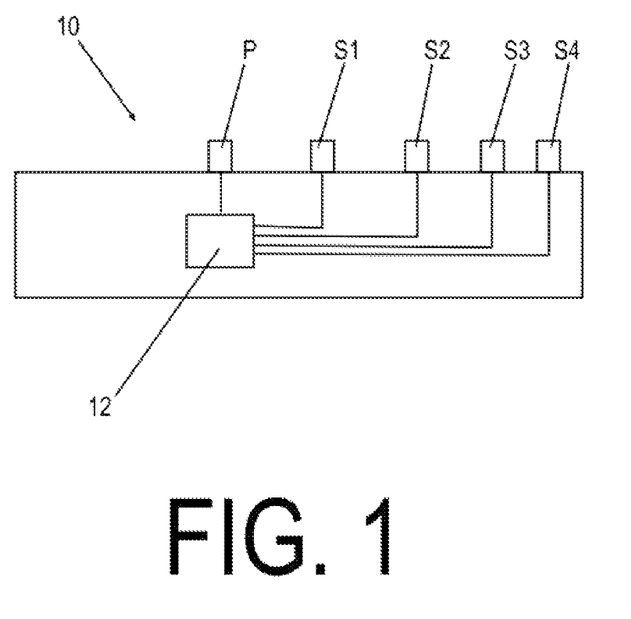
FIG. 1 is a side perspective view of a system for determining the orientation of a linear array of radio receivers in space according to one presently preferred embodiment of the invention.

As best shown in FIG. 1, one presently preferred embodiment of the invention comprises a system 10 for determining the direction and orientation in space of a linear array of radio receivers. The system according to a presently preferred embodiment comprises a primary radio receiver P and a plurality of secondary radio receivers $S_1$, $S_2$, $S_3$ $S_4$ arranged in a collinear configuration. The primary radio receiver and plurality of auxiliary radio receivers are capable of receiving radio signals with precise timing and phase. If the location of the array is not known by other means, the primary radio receiver P may be a transceiver capable of transmitting and receiving in order to determine the location of the array via TWR or TDOA type algorithms. While the preferred embodiment shown in FIG. 1 shows four auxiliary UWB radio receivers $S_1$, $S_2$, $S_3$, $S_4$ arranged in a linear with the primary receiver P, any configuration of one or more auxiliary radio receivers with a primary radio receiver will provide acceptable results.

Each of the primary UWB radio receiver P and secondary receivers $S_1$, $S_2$, $S_3$, $S_4$ are connected to a processing unit (PU) 12. While FIG. 1 shows the radio devices P, $S_1$, $S_2$, $S_3$, $S_4$ being hardwired to the PU 12, it is within the scope of the invention to allow the radio devices P, $S_1$, $S_2$, $S_3$, $S_4$ to wirelessly communicate with the PU 12.

Figure 2:
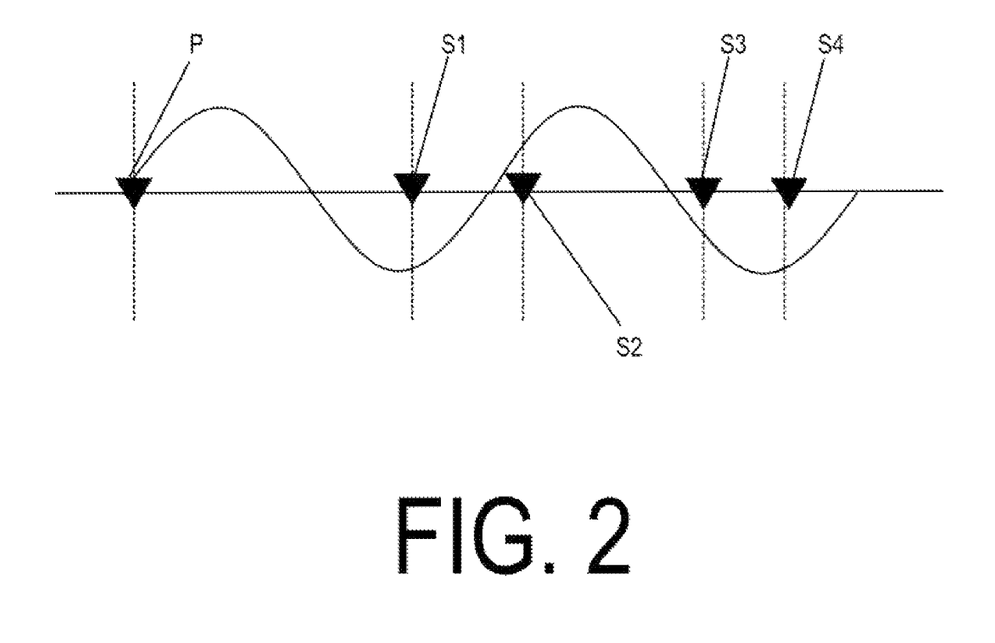
FIG. 2 is a graphic representation of a wave transmission from a transmitter of the system as it reaches each of the receivers on the array of the system shown in FIG. 1.

As seen in FIG. 1 and FIG. 2, the spacing between adjacent receivers P, $S_1$, $S_2$, $S_3$, $S_4$ is non-uniform. If they are spaced uniformly, the phase for each receiver can be the same (i.e. they occur at the same phase on the wave, even though the distance from the transmitter is different). Uniform, or symmetric, spacing can result in phase data that is under-determined having multiple answers for the phase set. As shown in FIG. 2, where the receivers are non-uniformly spaced, the signal hits each receiver at a different phase on the wave.

Figure 3:
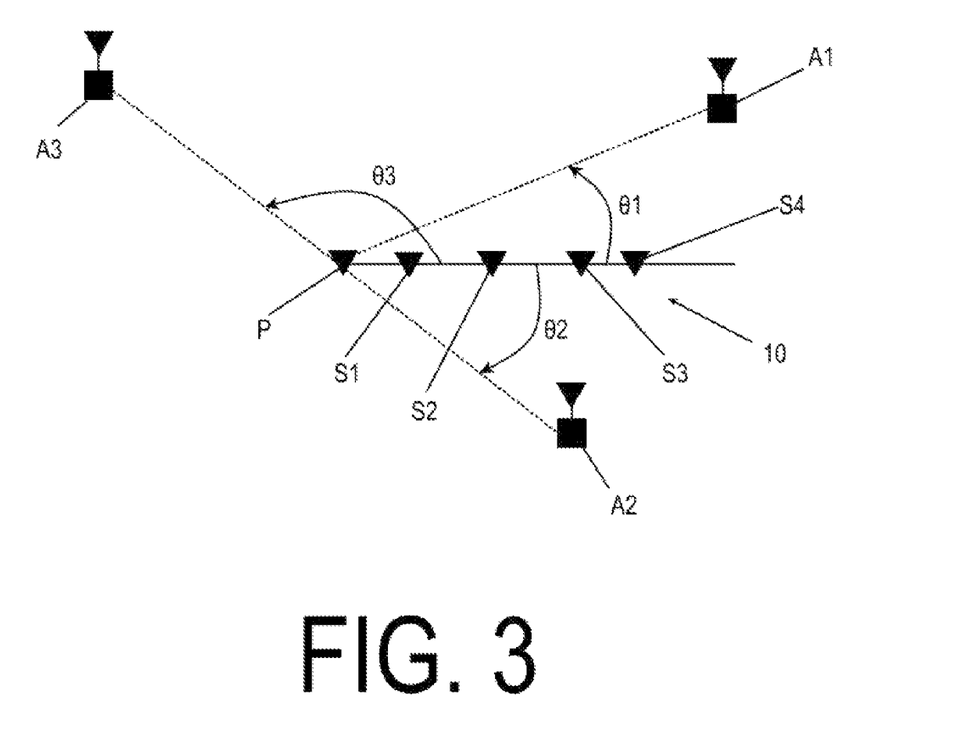
FIG. 3 is a schematic representation of a first step in the method for determining the orientation of a linear array of radio receivers in space according to one presently preferred embodiment of the invention.

As shown in FIG. 3, the system 10 further includes a plurality of uniquely identifiable radio transmitters $A_1$, $A_2$, $A_3$ positioned at known, surveyed locations in a coordinate system. Each transmitter $A_1$, $A_2$, $A_3$ transmits radio signals that are received by the array of receivers P, $S_1$, $S_2$, $S_3$, $S_4$.

First, the location of the primary receiver P of the receiver array is determined through an external process, such as Ultra-Wideband (UWB) Two-Way Ranging (TWR), UWB Time Distance of Arrival (TDoA), GPS, laser measurement, or other means known to those skilled in the art for determining location. One such method for determining the location of the primary receiver P is through the use of TWR to determine the distance dap between the transmitter A and the primary radio receiver P of the system 10. This part of the process is similar to that disclosed in applicant's U.S. Pat. No. 9,709,663 issued on Jul. 18, 2017, the subject matter of which is incorporated herein by reference. A series of packets are exchanged between the transmitter A and the primary radio receiver(transceiver) P as is disclosed in applicant's U.S. Pat. No. 10,401,472 issued on Sep. 3, 2019, the subject matter of which is incorporated herein by reference. From this information, the location of the primary radio receiver P can be determined.

With the location of the primary radio receiver P having been determined, the direction in which the aligned radio devices P, $S_1$, $S_2$, $S_3$, $S_4$ is pointed relative to a transmitter $A_1$ is then determined by using the phase angle of arrival (AoA) data from the transmitter $A_1$ through the process herein described. The same process is repeated for all additional transmitters $A_2$, $A_3$, etc.

In operation, the primary radio receiver P and secondary radio receivers $S_1$, $S_2$, $S_3$, $S_4$ receive radio signals from the transmitters $A_1$, $A_2$, $A_3$, which are located at known, surveyed positions in the coordinate system. Preferably, the transmissions are made sequentially, i.e. $A_1$, then $A_2$, then $A_3$, etc. The receiver array P, $S_1$, $S_2$, $S_3$, $S_4$ will receive each transmission and measure the phase of arrival. The phase of arrival at each receiver in most cases is slightly different because the distance from each receiver node to the transmitter is different. The signals arrive at slightly different times and at slightly different points on the wave of the signal. The phase difference of arrival data is input into the processor 12. From that data, the angle of each receiver to the transmitter $\Theta(\Theta_1$ for $A_1$, $\Theta_2$ for $A_2$, $\Theta_3$ for $A_3)$ is determined. The phase angles can be computed by use of a look-up table wherein the expected values have been pre-calculated and entered into the table, or through the use of mathematical equations to determine the angle, to determine whether it is tilted up, down, left, right, etc.

A plurality of transmitters is required to determine an accurate orientation of the array of receivers. Referring to FIG. 3, the device 10 could pivot around the axis between the primary receiver P and $A_1$ without the angle $\Theta_1$ changing, thus not fully determining the orientation. If the angle $\Theta_1$ to the first transmitter $A_1$ and the angle $\Theta_2$ to a second transmitter $A_2$ are determined, there two orientations the device can be pointed and satisfy both. To fully determine the orientation of the device 10, a third transmitter $A_3$ is required. With the angles $\Theta_1$, $\Theta_2$, $\Theta_3$ of the device 10 relative to three transmitters $A_1$, $A_2$, $A_3$ known, the orientation of the device 10 and the array of receivers can be accurately determined.

Figure 4A:
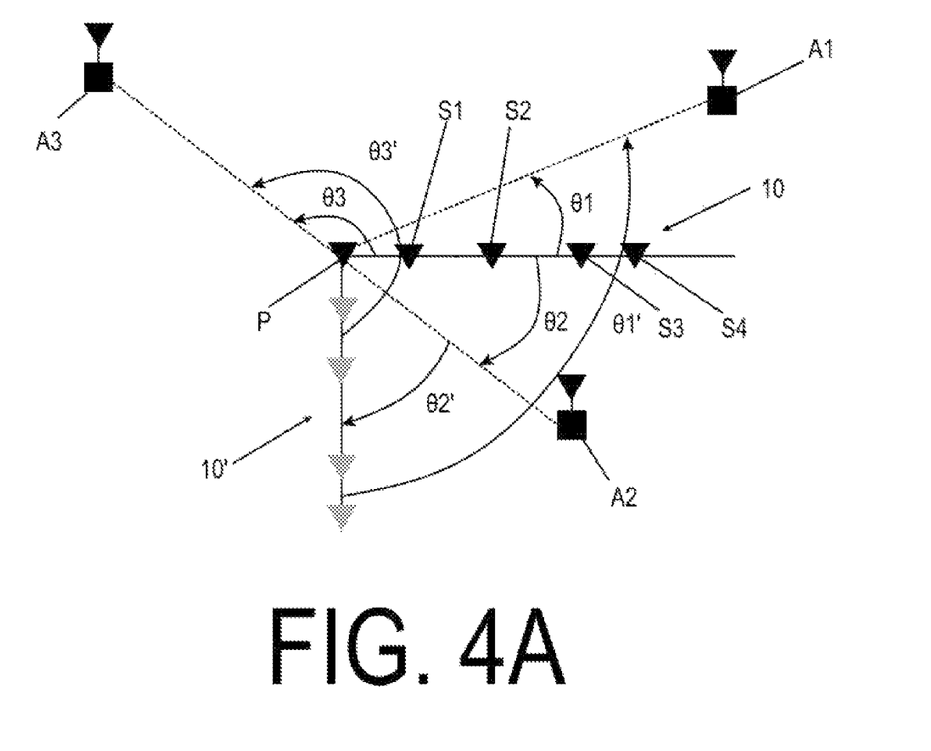
FIG. 4A is a schematic representation of a further step in the method for determining the orientation of a linear array of radio receivers in space according to one presently preferred embodiment of the invention.

As shown in FIG. 4A, the process of determining the orientation of the device 10 and array of receivers P, $A_1$, $A_2$, $A_3$ continues by selecting an arbitrary orientation of the array 10'. From this arbitrary orientation 10', the nominal angles $\Theta'_1$, $\Theta'_2$, $\Theta'_3$ to each transmitter $A_1$, $A_2$, $A_3$ can be calculated mathematically.

The calculated angles $\Theta'_1$, $\Theta'_2$, $\Theta'_3$ at the arbitrary position 10' are then compared to the angles $\Theta'_1$, $\Theta'_2$, $\Theta'_3$ at the measured/recorded position 10, and the error between each is determined $(\Theta_1-\Theta'_1; \Theta_2-\Theta'_2; \Theta_3-\Theta'_3)$. If the difference is not within the level of acceptable error, a second arbitrary orientation of the array 10" is selected that is closer to the measured/recorded position 10. The convergence algorithm is then repeated until the error values are below some minimal acceptable threshold.

Figure 4B:
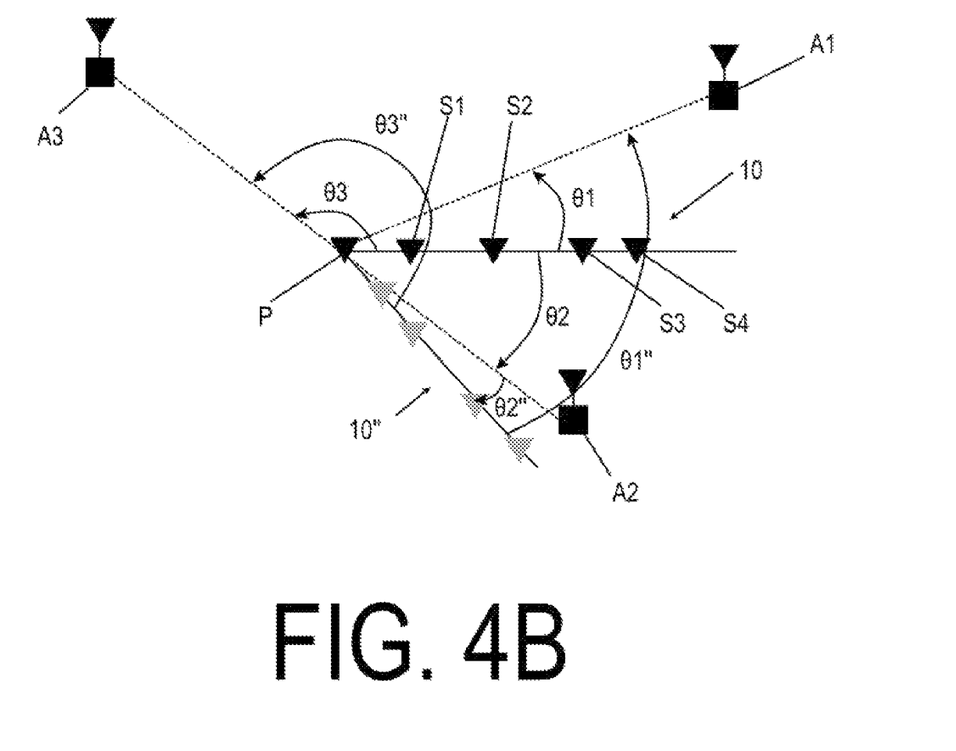
FIG. 4B is a schematic representation of a further step in the method for determining the orientation of a linear array of radio receivers in space according to one presently preferred embodiment of the invention.

As shown in FIG. 4B, this iterative process/convergence algorithm is repeated (i.e. selection of additional arbitrary orientations of the array (10''', 10'''' . . . ) until the error for the angles is within the predetermined level of acceptable error in relation to the measured/recorded position 10. Once the arbitrary position 10' and the measured/recorded position 10 are within the predetermined level of acceptable error, the orientation of the device 10 and the array of receivers P, $S_1$, $S_2$, $S_3$, $S_4$ is established and the iterative process is terminated.

Several enhancements to the basic system and process are also within the scope of the invention. Once the initial position and orientation of the device 10 and array of receivers P, $S_1$, $S_2$, $S_3$, $S_4$ has been ascertained, the system can store that value and start at that point the next time the orientation is to be determined. This is especially useful in tracking the device 10 as it moves and reduces the overall processing time.

Figure 5A:
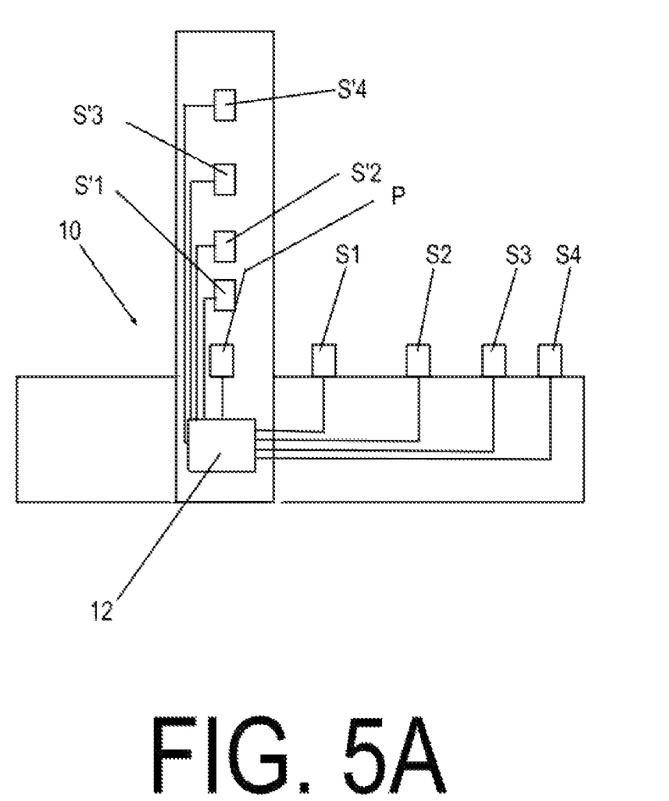
FIG. 5A is a side perspective view of a system for determining the orientation of a linear array of radio receivers in space according to an alternative embodiment of the invention.
Figure 5B:
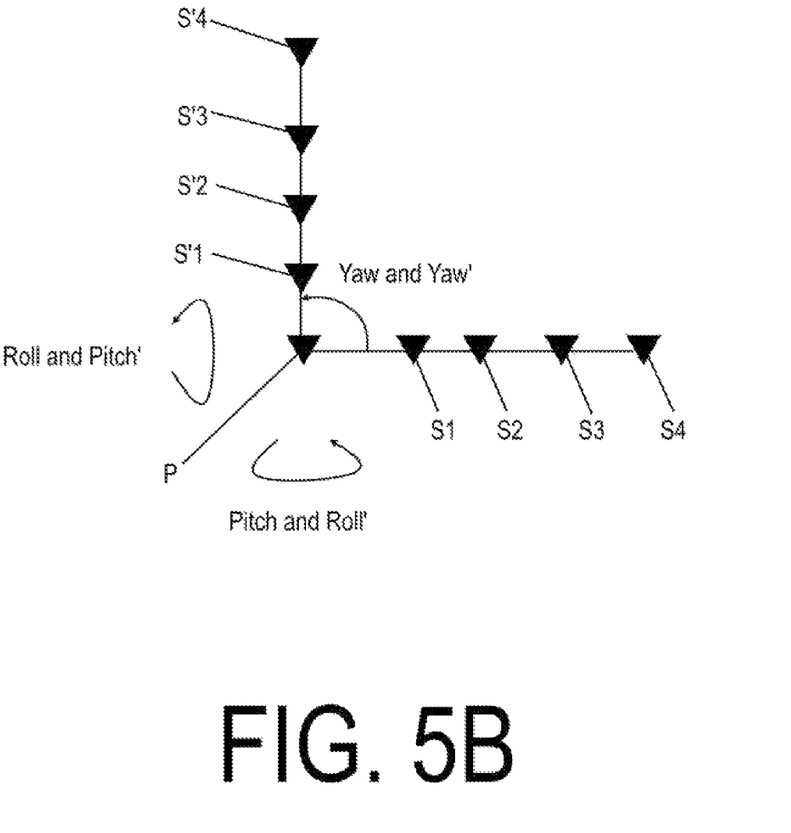
FIG. 5B is a graphic representation of the array of the system shown in FIG. 5A showing how the system measures yaw, roll and pitch.

The system according to the embodiment shown in FIG. 1 can determine pitch (elevation) and yaw (azimuth), but not roll (twist) of the device 10 and array of receivers P, $S_1$, $S_2$, $S_3$, $S_4$. However, as shown in FIG. 5A and FIG. 5B, if a second array of antennas $S'_1$, $S'_2$, $S'_3$, $S'_4$ are provided in a fixed orientation that is not parallel to the first array of antennas, roll can be determined. Roll is determined by repeating the aforementioned process to determine the orientation of P, $S_1$, $S_2$, $S_3$, $S_4$, but with the set of devices P, $S'_1$, $S'_2$, $S'_3$, $S'_4$. In the simplest case, as shown in FIG. 5A and FIG. 5B, where the primary collinear array P, $S_1$, $S_2$, $S_3$, $S_4$, and the secondary collinear array P, $S'_1$, $S'_2$, $S'_3$, $S'_4$, are orthogonal to one another, the pitch from the secondary collinear array (Pitch') is equivalent to the roll of primary collinear array (Roll), and the roll of secondary collinear array (Roll') is equivalent to the pitch of the primary collinear array (Pitch). Each collinear array orientation, primary and secondary, is determined along z-axis. As long as the secondary collinear array is in a known fixed orientation relative to the primary collinear array, and not parallel to the primary collinear array, its 2-axis orientation can be used to determine the 3$^{rd}$ axis (roll in this case) of the primary collinear array.

This detailed description, and particularly the specific details of the exemplary embodiment disclosed, is given primarily for clearness of understanding and no unnecessary limitations are to be understood therefrom, for modifications will become evident to those skilled in the art upon reading this disclosure and may be made without departing from the spirit or scope of the claimed invention.

We claim:

1. A system for determining an orientation in space of a linear array of radio receivers in a workspace comprising:
   a. a primary radio receiver capable of measuring phase of arrival of a received signal;
   b. a secondary radio receiver capable of measuring phase of arrival of a received signal, located a first distance from said primary radio receiver;
   c. a plurality of radio transmitters positioned in the workspace at known, fixed locations relative to the primary radio receiver; and
   d. a processing unit in communication with said primary radio receiver and said secondary radio receiver, said processing unit capable of calculating an angle between each of the plurality of radio transmitters and an axis comprising a line passing through the primary radio receiver and the secondary radio receiver, and capable of calculating an orientation determination algorithm.

2. The system for determining an orientation in space of a linear array of radio receivers according to claim 1, wherein said secondary radio receiver comprises a plurality of secondary radio receivers located collinearly along the axis.

3. The system for determining an orientation in space of a linear array of radio receivers according to claim 2, wherein distances between adjacent secondary radio receivers is non-uniform.

4. The system for determining an orientation in space of a linear array of radio receivers according to claim 1, wherein the primary radio receiver is a transceiver.

5. The system for determining an orientation in space of a linear array of radio receivers according to claim 1, wherein said plurality of radio transmitters comprises at least three radio transmitters.

6. The system for determining an orientation in space of a linear array of radio receivers according to claim 1, wherein said secondary radio receiver comprises four secondary radio receivers located along the central axis.

7. The system for determining an orientation in space of a linear array of radio receivers according to claim 1, further comprising a tertiary radio receiver capable of measuring phase of arrival of a received signal, located a second distance from said primary radio receiver, and a secondary axis comprising a line passing through the primary radio receiver and the tertiary radio receiver, said axis and said secondary axis being offset from one another.

8. The system for determining an orientation in space of a linear array of radio receivers according to claim 7, wherein said secondary radio receiver comprises a plurality of secondary radio receivers located along the axis, and said tertiary radio receiver comprises a plurality of tertiary radio receivers located along the secondary axis.

9. A method for determining an orientation in space of a linear array of radio receivers in a workspace comprising the steps of:
   a. transmitting radio signals from a plurality of radio transmitters positioned in the workspace at known, fixed locations relative to a primary radio receiver capable of measuring phase of arrival of a received signal;
   b. receiving said radio signals at the primary radio receiver, and at a secondary radio receiver capable of measuring phase of arrival of a received signal, located a first distance from said primary radio receiver;
   c. measuring the phase of arrival of the radio signals at the primary radio receiver and the secondary radio receiver;
   d. transmitting the phase of arrival to a processing unit in communication with said primary radio receiver and said secondary radio receiver;
   e. implementing an angle determining algorithm to determine a calculated angle between each of the plurality of radio transmitters and a collinear axis comprising a line passing through the primary radio receiver and the secondary radio receiver using the measured phase of arrival at the primary radio receiver and the measured phase of arrival at the secondary radio receiver.

10. The method for determining an orientation in space of a linear array of radio receivers according to claim 9, further comprising the steps of:
    a. selecting an arbitrary orientation of the linear array of receivers;
    b. computing an estimated angle between the plurality of transmitters and the axis in the arbitrary orientation based on the known coordinate locations of the primary radio receiver and secondary radio receiver in the arbitrary orientation, and the known, fixed locations of the plurality of radio transmitters;
    c. comparing the calculated angle to the estimated angle;
    d. determining whether the estimated angle is within an acceptable margin of error to the calculated angle;
    e. if the estimated angle for the arbitrary orientation is not within an acceptable margin of error, selecting a further arbitrary orientation;
    f. repeating steps b-e for each further arbitrary orientation until an acceptable margin of error is reached.

11. The method for determining an orientation in space of a linear array of radio receivers according to claim 10, wherein the further arbitrary orientation reduces the margin of error.

12. The method for determining an orientation in space of a linear array of radio receivers according to claim 9, wherein the radio signals from the plurality of radio transmitters are transmitted sequentially.

13. The method for determining an orientation in space of a linear array of radio receiver according to claim 9, wherein a processing unit that is in communication with the primary radio receiver and the secondary radio receiver is provided to make the calculations and computations based on the phase angle data.

14. The method for determining an orientation in space of a linear array of radio receivers according to claim 10, further comprising the steps of:
    a. storing a determined orientation of the linear array of radio receivers after the acceptable margin of error is reached; and
    b. re-checking the angle of the linear array of radio receivers to the plurality of radio transmitters by beginning with the stored determined orientation of the linear object instead of the arbitrary point in step (a).

15. The method for determining an orientation in space of a linear array of radio receivers according to claim 9, wherein the step of receiving said radio signals at a secondary radio receiver capable of measuring phase of arrival of a received signal, located a first distance from said primary radio receiver, comprises receiving said radio signals at a plurality of secondary radio receivers located along the axis.

16. The method for determining an orientation in space of a linear array of radio receivers according to claim 15, wherein distances between adjacent secondary radio receivers is non-uniform.

17. A method for determining an orientation in space and roll of a linear array of radio receivers in a workspace comprising the steps of:
  a. transmitting radio signals from a plurality of radio transmitters positioned in the workspace at known, fixed locations relative to a primary radio receiver capable of measuring phase of arrival of a received signal;
  b. receiving said radio signals at the primary radio receiver;
  c. receiving said radio signals at a secondary radio receiver capable of measuring phase of arrival of a received signal, said secondary radio receiver located a first distance from said primary radio receiver along a primary axis comprising a line passing through the primary radio receiver and the secondary radio receiver;
  d. receiving said radio signals at a tertiary radio receiver capable of measuring phase of arrival of a received signal, said tertiary radio receiver located a second distance from said primary radio receiver along a secondary axis comprising a line passing through the primary radio receiver and the tertiary radio receiver, wherein said primary axis and said secondary axis being offset from one another at a known, fixed angle;
  e. measuring the phase of arrival of the radio signals at the primary radio receiver, the secondary radio receiver, and the tertiary radio receiver;
  f. transmitting the phase of arrival to a processing unit in communication with said primary radio receiver, said secondary radio receiver, and said tertiary receiver;
  g. implementing a first orientation determining algorithm to determine a calculated angle between each of the plurality of radio transmitters and the primary axis using the measured phase of arrival at the primary radio receiver and the measured phase of arrival at the secondary radio receiver;
  h. implementing a second orientation determining algorithm to determine a calculated angle between each of the plurality of radio transmitters and the secondary axis using the measured phase of arrival at the primary radio receiver and the measured phase of arrival at the tertiary radio receiver;
  i. implementing a roll determining algorithm to calculate the roll of the linear array of radio receivers based on the known fixed angle between the secondary receiver located on the primary axis and the tertiary receiver located on the secondary axis and the calculated angles between each of the plurality of radio receivers and the secondary axis.

18. The method for determining an orientation in space and roll of a linear array of radio receivers according to claim 17, wherein the radio signals from the plurality of radio transmitters are transmitted sequentially.

19. The method for determining an orientation in space and roll of a linear array of radio receivers according to claim 17, wherein a processing unit that is in communication with the primary radio receiver, the secondary radio receiver, and the tertiary radio receiver is provided to make the calculations and computations based on the phase angle data.

20. The method for determining an orientation and roll in space of a linear array of radio receivers according to claim 17, wherein the step of receiving said radio signals at a secondary radio receiver capable of measuring phase of arrival of a received signal, located a first distance from said primary radio receiver, comprises receiving said radio signals at a plurality of secondary radio receivers located along the axis, and the step of receiving said radio signals at a tertiary radio receiver capable of measuring phase of arrival of a received signal, located a first distance from said primary radio receiver, comprises receiving said radio signals at a plurality of tertiary radio receivers located along the axis.

21. The method for determining an orientation and roll in space of a linear array of radio receivers according to claim 20, wherein distances between adjacent secondary radio receivers and adjacent tertiary radio receivers is non-uniform.

* * * * *